(12) United States Patent
Banerjee et al.

(10) Patent No.: US 7,426,477 B2
(45) Date of Patent: Sep. 16, 2008

(54) METHOD AND APPARATUS FOR INSURING DELIVERY OF ELECTRONIC DOCUMENTS IN A NETWORK DATA PROCESSING SYSTEM

(75) Inventors: Dwip N. Banerjee, Austin, TX (US); Rabindranath Dutta, Austin, TX (US); Kamal Chandrakant Patel, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 09/915,436

(22) Filed: Jul. 26, 2001

(65) Prior Publication Data

US 2003/0023521 A1 Jan. 30, 2003

(51) Int. Cl.
*G06Q 40/00* (2006.01)
(52) U.S. Cl. .......................................... 705/4
(58) Field of Classification Search ................. 705/400, 705/4
See application file for complete search history.

(56) References Cited

U.S. PATENT DOCUMENTS

| | | | |
|---|---|---|---|
| 4,868,758 A * | 9/1989 | Kokubu | 705/400 |
| 6,145,079 A | 11/2000 | Mitty et al. | |
| 6,161,181 A | 12/2000 | Haynes, III et al. | |
| 6,199,052 B1 | 3/2001 | Mitty et al. | |
| 6,199,054 B1 * | 3/2001 | Khan et al. | 705/400 |
| 2002/0095317 A1 * | 7/2002 | McCabe | 705/4 |
| 2005/0027849 A1 * | 2/2005 | Cianciarulo et al. | 709/223 |

FOREIGN PATENT DOCUMENTS

EP 1068697 A1 4/1998

OTHER PUBLICATIONS

Cardot, Steve, "Portogo Insurance Protects Confiendtiality, Deliverability and Security of Internet Transmissions", Feb. 2, 2001, The Ezine Dot net.*
Tanaka et al., "Digital Multi-Signatue Scheme for Facsimile-Mail Service", Denshi Joho Tsushin Gakkai Ronbunshi B-1, vol. J74, Issue 10, Oct. 1991, pp. 748-756.
Hann, "Guaranteeing Electronic Documents", Bests Review vol. 101, No. 5, Sep. 2000, p. 67.

* cited by examiner

*Primary Examiner*—James Kramer
*Assistant Examiner*—Jay A Kramer
(74) *Attorney, Agent, or Firm*—Duke W. Yee; Marilyn S. Dawkins; Wayne B. Bailey

(57) ABSTRACT

A method, apparatus, and computer implementable instructions for insuring delivery of an electronic document in a data processing system. A request is received from a requestor to insure delivery of the electronic document. In response to receiving the request, a payment amount to insure delivery is identified based on network characteristics of a network in which the electronic document is to be transmitted. An acknowledgment of the electronic document is sent to the requestor, wherein the acknowledgment includes the payment amount. The electronic document is delivered in response to receiving a reply to the acknowledgment from the requestor accepting the identification of the payment amount. The requestor is notified of a successful delivery of the electronic document in response to receiving an acknowledgment from the recipient.

18 Claims, 4 Drawing Sheets

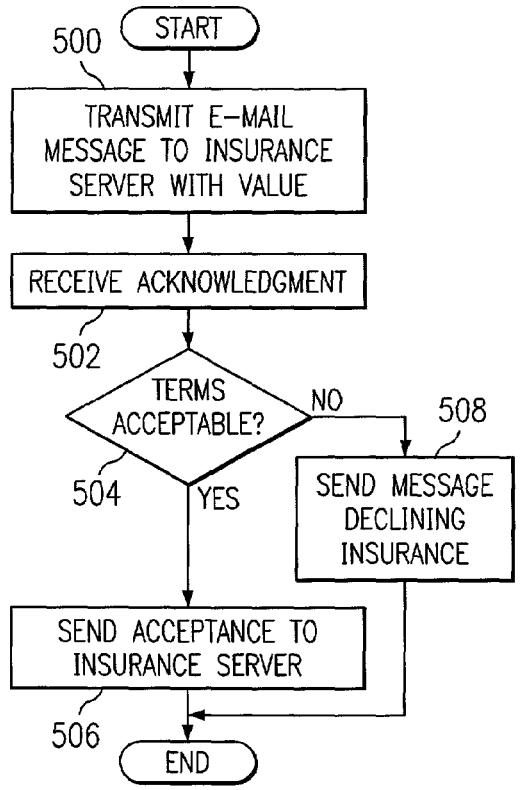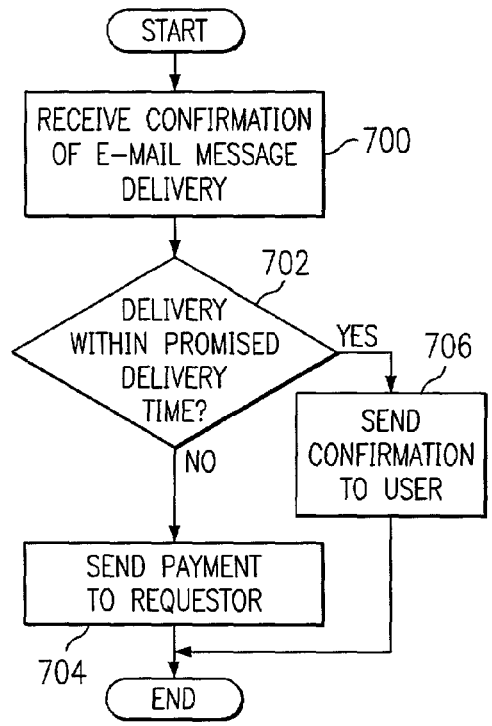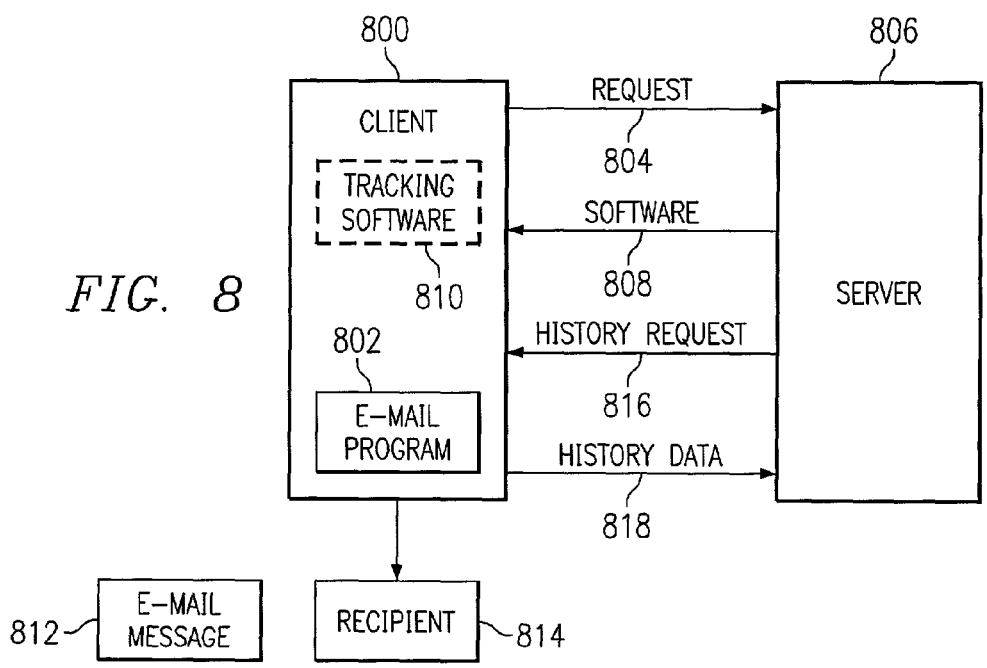

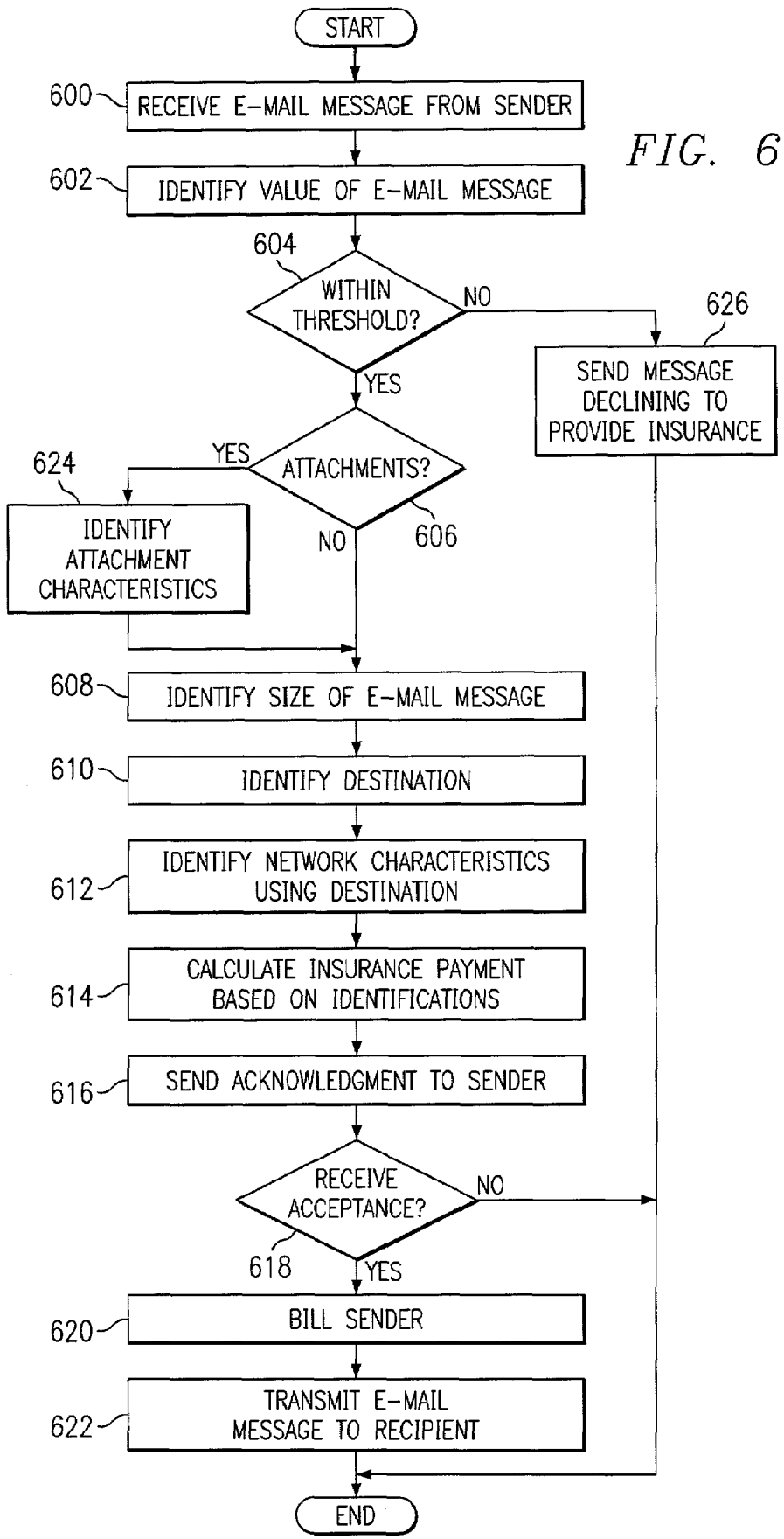

METHOD AND APPARATUS FOR INSURING DELIVERY OF ELECTRONIC DOCUMENTS IN A NETWORK DATA PROCESSING SYSTEM

BACKGROUND OF THE INVENTION

1. Technical Field

The present invention relates generally to an improved data processing system and in particular to a method and apparatus for transferring data. Still more particularly, the present invention provides a method, apparatus, and computer implementable instructions for insuring delivery of electronic documents in a network data processing system.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach. Many uses have been made of the Internet.

For example, good and services may be purchased on the Internet. Further, electronic mail or "e-mail" is common place and is taking over the role that physical mail once had in personal and business uses. E-mail and other types of electronic documents form one of the most important aspects of commerce on the electronic commerce as well as for other purposes. With heavier reliance on the Internet to send and transmit documents that were normally sent as physical documents by mail, overnight delivery services, and facsimile, the timely delivery of documents is just as important with delivery of documents using the Internet. The timely delivery of documents or other data is mission critical for many businesses to be successful. This situation is especially true for real time data that needs to be delivered by specific deadlines to be of any use to the recipient. Examples of critical real time data include, for example, electronic tax returns, payments for property bills, and bids on contracts. Delays are unacceptable in some instances. There is a need and a desire to protect businesses against delays that may occur.

Therefore, it would be advantageous to have an improved method, apparatus, and computer implementable instructions for protecting an entity against damages that may occur with an untimely delivery of data.

SUMMARY OF THE INVENTION

The present invention provides for a method, apparatus, and computer implementable instructions for insuring delivery of an electronic document in a data processing system. A request is received from a requestor to insure delivery of the electronic document. In response to receiving the request, a payment amount to insure delivery is identified based on network characteristics of a network in which the electronic document is to be transmitted. An acknowledgment of the electronic document is sent to the requestor, wherein the acknowledgment includes the identification of the payment amount. The electronic document is delivered in response to receiving a reply to the acknowledgment from the requestor accepting the payment amount. The requestor is notified of a successful delivery of the electronic document in response to receiving an acknowledgment from the recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process used for requesting insurance for timely delivery of data in accordance with a preferred embodiment of the present invention;

FIG. 6 is a flowchart of a process used for processing requests for insuring timely delivery of data in accordance with a preferred embodiment of the present invention;

FIG. 7 is a flowchart of a process used for confirming delivery of an e-mail message in accordance with a preferred embodiment of the present invention; and FIG. 8 is a block diagram of components used in insuring delivery of data in accordance with an alternative embodiment of the present invention.

DETAILED DESCRIPTION OF THE PREFERRED EMBODIMENT

Figure 1:
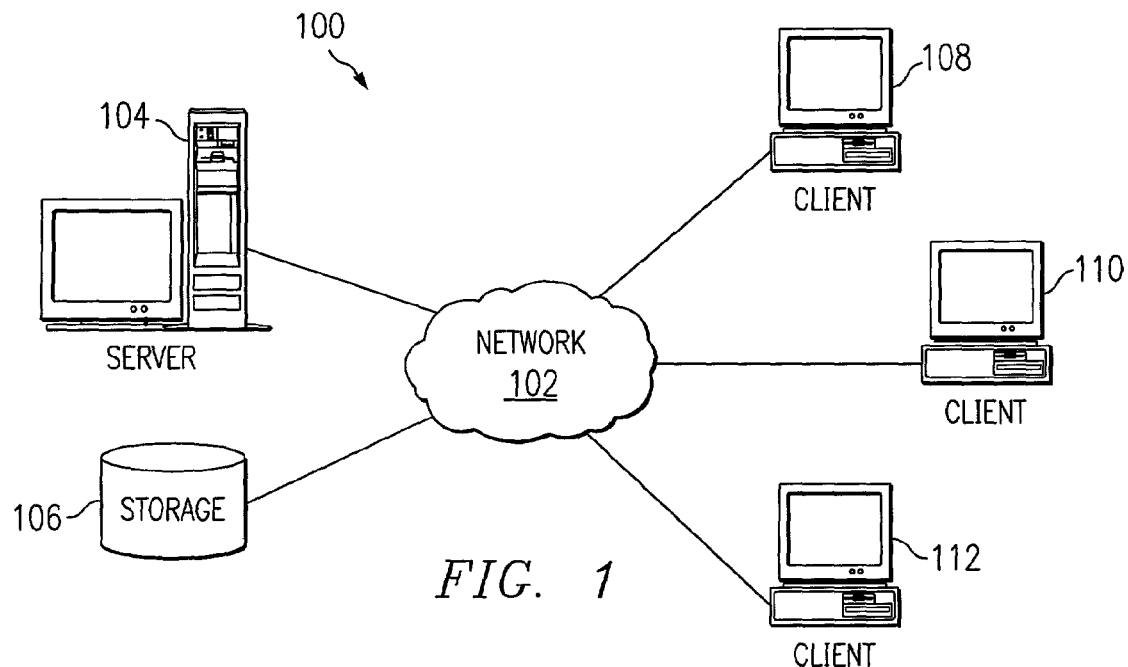
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In these, examples, server 104 may serve as an insurance server to insure the deliver of data within network 102. Clients, such as clients 108, 110, and 112, may request that data, such as electronic documents, e-mail, or real time data, be insured in the instance that the data is not delivered by a requested time. Server 104 may be provided a location for receiving the data and sending the data to the destination. Also, server 104 may evaluate the data and network characteristics with respect to the destination to identify when delivery can be guaranteed. Insurance is issued with a value agreed to by the insuring party and the sender of the data in case the data is delivered in an untimely manner.

Figure 2:
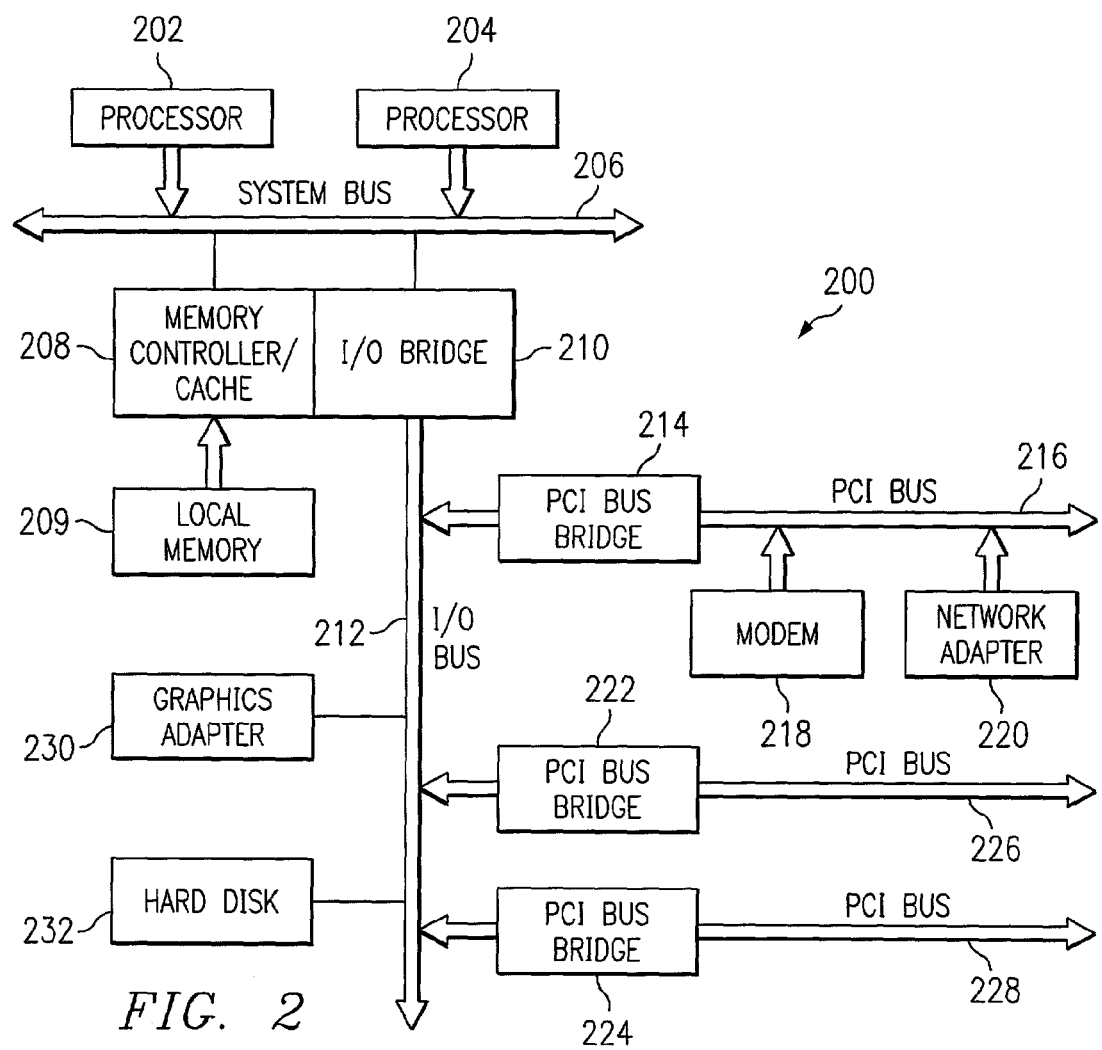
FIG. 2 is a block diagram of a data processing system that may be implemented as a server in accordance with a preferred embodiment of the present invention.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention. Referring to FIG. 2, a block diagram of a data processing system that may be implemented as a server, such as server 104 in FIG. 1, is depicted in accordance with a preferred embodiment of the present invention.

Data processing system 200 may be implemented as an insurance server to receive data for delivery to destinations for clients who have insured the delivery of this data. Further, data processing system 200 also may be used to determine when data can be delivered and provide terms for insurance for the delivery of the data. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
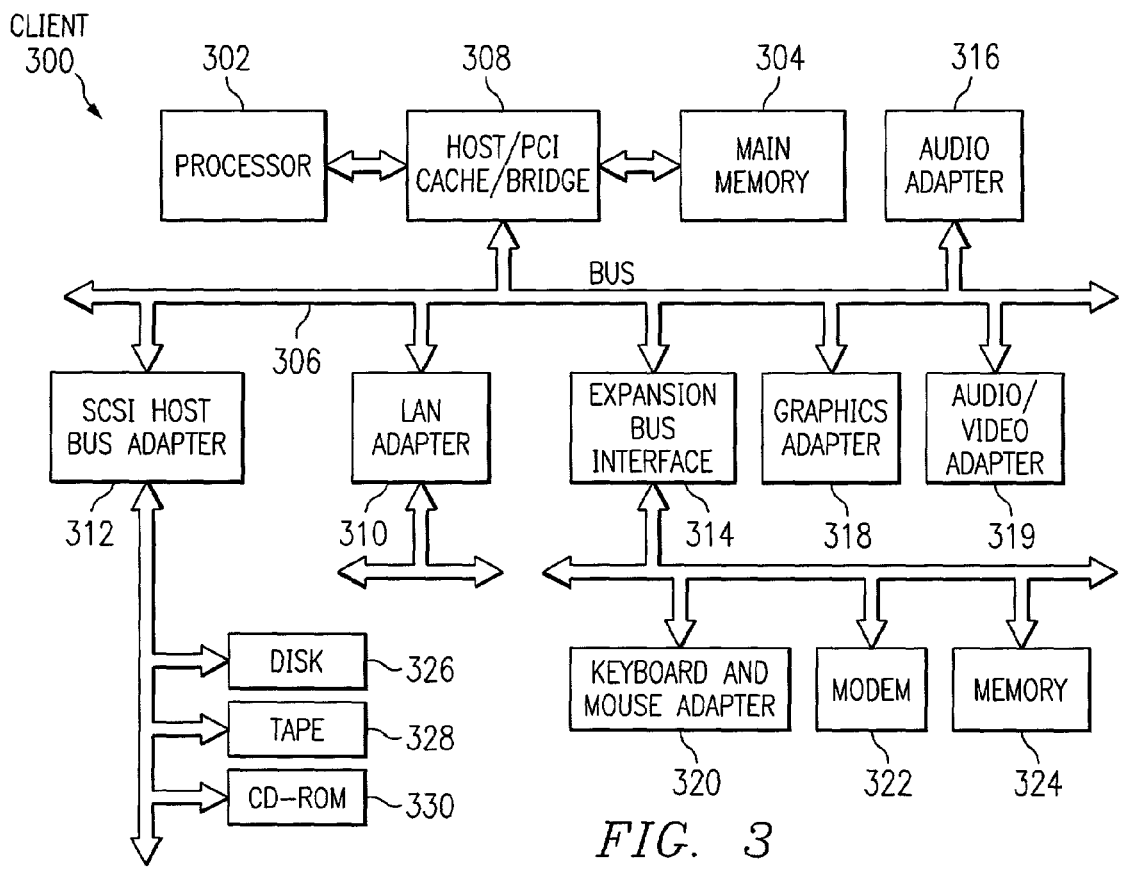
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. A user at client computer 300 may desire to obtain protection against damages that may occur if data, such as e-mail, real time data, or an electronic document, is delivered in an untimely manner. The user sends the data to an insurance entity, such as an insurance server. The user also may transmit a value of the data with the data. A response with terms of the insurance is received indicating when the data can be delivered for the insured amount. By accepting the terms, the data is now insured. Of course the terms of insurance and the premium paid may be arranged ahead of time, especially in cases in which data is sent on a regular basis.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
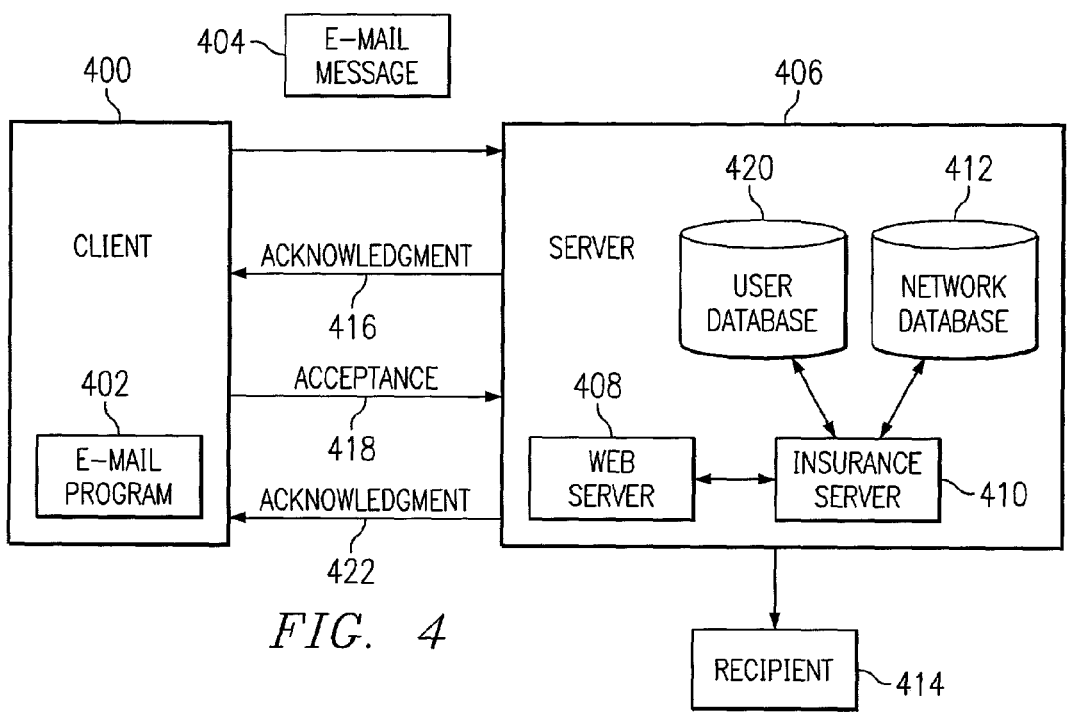
FIG. 4 is a block diagram of components used in insuring delivery of data in accordance with a preferred embodiment of the present invention.

Turning now to FIG. 4, a block diagram of components used in insuring delivery of data is depicted in accordance with a preferred embodiment of the present invention. In this example, client 400 sends e-mail and electronic documents to various recipients using e-mail program 402. Client 400 may be implemented using data processing system 300 in FIG. 3. In this example, e-mail message 404 is sent to server 406, which may be implemented using data processing system 200 in FIG. 2.

Server 406 receives e-mail message 404 at Web server 408, which serves to process requests received on the Internet. Web server 408 sends e-mail message 404 to insurance server 410 for processing. In this example, e-mail message 404 may include a value of the e-mail and/or any attachments, such as a legal document, scientific data, or images. The destination for e-mail message 404 is identified and network characteristics are examined and analyzed using information from network database 412. In this example, the destination is recipient 414. These network characteristics include, for example, network traffic characteristics, network congestion, reliability of network properties, and statistical transmission times to the destination. Tools are available, such as "pchar" that characterize the band width latency and loss of links along an end to end path through the Internet. The pchar tool is a reimplementation of the pathchar utility, written by Van Jacobson. This type of tool was first produced at Sandia National Laboratories. Another tool called "skitter" actively probes the Internet in order to analyze topology and performance. Skitter is a tool available from Cooperative Association for Internet Data Analysis (CAIDA). The characteristics stored in network database 412 may be obtained from various sources and using various available metrics programs. E-mail message 404 also may be analyzed to determine a delivery time. The size of e-mail message 404 as well as the content may be used in this analysis. Based on this analysis, insurance server 410 identifies an amount of time in which e-mail message 404 can be delivered to recipient 414.

E-mail message 404 also may include a value of the document or an amount of insurance desired, in case the document is delivered in an untimely manner. Based on the value identified, a premium or cost of the insurance may be set. Further, this premium or cost may be identified using other characteristics, such as, for example, the number of characters or pages in e-mail message 404, a geographic location of recipient 414, the time of delivery, and other contents of the delivery, such as attachments.

Insurance server 410 returns acknowledgment 416 to client 400 through Web server 408. In this example, the acknowledgment includes an indication of receipt of e-mail message 404, the destination address, a cost of insurance, and an estimated time to deliver to the destination. If the user agrees to these terms and the delivery time is acceptable, acceptance 418 is sent back to insurance server 410. Upon receiving the acceptance, insurance server 410 sends e-mail message 404 to recipient 414. In addition, the user is billed for the insurance using user database 420. User database 420 contains information, such as an identification of customers or users and the terms of insurance associated with these customers or users. In these examples, if an acknowledgment of the receipt of e-mail message 404 is not received from recipient 414 by a selected amount of time, insurance server 410 resends e-mail message 404 to recipient 414 either through the same route or another route.

Upon receiving acknowledgment of the receipt of e-mail message 404 from recipient 414, acknowledgment 422 is sent to client 400 indicating a successful delivery of e-mail message 404. If e-mail message 404 is delivered in an untimely manner, then details of the delivery may be sent. These details may include, for example, the actual time of delivery or the identification of traffic problems. In this instance, a payment is made to client 400. This payment for the untimely delivery is entered into user database 420 in this example.

In the depicted examples, the data illustrated is in the form of an e-mail message and any attachments to the message. The mechanism of the present invention also may be applied to other types of data, such as the transmission of real time data. Further, the terms of insurance for the transmission of data may be arranged prior to receiving the data depending on the particular implementation. Further, the example in FIG. 4 depicts components to explain the functional features of one embodiment of the present invention and is not meant to limit the manner in which these features may be implemented. For example, user database 420 and network database 412 do not necessarily need to be located within server 406. Instead, they may be located in other machines depending on the particular implementation.

With reference now to FIG. 5, a flowchart of a process used for requesting insurance for timely delivery of data is depicted in accordance with a preferred embodiment of the present invention. The process illustrated in FIG. 5 may be implemented as instructions for a computer program in a client, such as client 400 in FIG. 4.

The process begins by transmitting an e-mail message to an insurance server with a value for the e-mail message (step 500). An acknowledgment is received (step 502). This acknowledgment includes terms for insuring the delivery of the e-mail message. These terms include, for example, a time by which the e-mail message can be delivered and a payment amount for the insurance. A determination is then made as to whether the terms are acceptable to the user (step 504). If the terms are acceptable, an acceptance of the terms is sent to the insurance server (step 506) with the process terminating thereafter. If the terms are not acceptable, a message declining the insurance is sent to the insurance server (step 508) and the process terminates thereafter.

With reference now to FIG. 6, a flowchart of a process used for processing requests for insuring timely delivery of data is depicted in accordance with a preferred embodiment of the present invention. The process illustrated in FIG. 6 may be implemented as instructions for a computer program in a server, such as server 406 in FIG. 4.

The process begins by receiving an e-mail message from a sender (step 600). Next, a value of the e-mail message is identified (step 602). The value of the e-mail message to be sent is identified within the e-mail message or in an attachment to the e-mail message in this example. A determination is made as to whether the value is within a threshold (step 604). In some cases, the value requested may be high enough that insurance will not be provided for the e-mail message. If the value is within the threshold, a determination is then made as to whether the e-mail message contains attachments (step 606). These attachments may be, for example, a word processing document, scientific data, images, or audio data. If the e-mail message does not contain attachments, the size of the e-mail message is identified (step 608). Then, a destination is identified (step 610).

Network characteristics are identified using the destination (step 612). In step 612, these network characteristics are those associated with different routes to the destination. An insurance payment is calculated based on the characteristic identifications (step 614), and an acknowledgment is sent to the sender (step 616). A determination is made as to whether an acceptance by the sender is received (step 618). If an acceptance is received, the sender is billed (step 620). In step 620, the billing of a user is made through a database, such as user database 420 in FIG. 4. An e-mail message is transmitted to the recipient of the insurance (step 622) with the process terminating thereafter.

Turning back to step 618, if an acceptance is not received, the process terminates. With reference again to step 606, if the e-mail message contains attachments, the attachment characteristics are identified (step 624) and the process proceeds to step 608 as described above. Turning back to step 604, if the value of the e-mail message is not within the threshold, a message declining to provide insurance is sent (step 626) and the process terminates.

With reference now to FIG. 7, a flowchart of a process used for confirming delivery of an e-mail message is depicted in accordance with a preferred embodiment of the present invention. The process illustrated in FIG. 7 may be implemented as instructions for a computer program in a server, such as server 406 in FIG. 4.

The process begins by receiving a confirmation of an e-mail message delivery (step 700). Next, a determination is made as to whether the delivery was made within the promised delivery time (step 702). This determination is made by comparing the actual delivery time with the delivery time set in the terms of the insurance for the document. The terms may be found in a database, such as user database 420 in FIG. 4. If the delivery is not made by the promised or guaranteed time, then a payment is sent to the requestor (step 704) with the process terminating thereafter. This payment is set by the terms of the insurance. Otherwise, a confirmation of the successful delivery is sent to the user (step 706) with the process terminating thereafter.

One of ordinary skill in the art will recognize that the present invention is not limited in scope to the above-described preferred embodiment; the present invention encompasses many variations. For example, in one alternate embodiment, the amount a sender pays for the insurance increases as the number of times the sender is compensated for untimely message deliveries. This is analogous to the way in which automobile insurance works, where drivers who file many claims pay higher premiums.

The block diagram in FIG. 8 depicts yet another variation on the present invention. The alternative embodiment in FIG. 8 places the responsibility for delivering the electronic mail message on the client, rather than on the server as in FIG. 4.

Client 800 has an electronic mail program 802 installed. To send an insured electronic mail message with electronic mail program 802, client 800 issues a request (804) to server 806 to register for insurance services. Client 800 then downloads (808) tracking software 810 from server 806. Tracking software 810 is then installed on client 800. Tracking software 810 keeps a history log reflecting when and to whom electronic mail messages are sent and successfully delivered.

E-mail program 802 sends electronic mail message 812 to recipient 814. Tracking software 810 keeps track of when electronic mail message 812 was sent and successfully delivered to recipient 814. At some point, server 806 issues a request (816) to client 800 to receive the history log information recorded by tracking software 810. Client 800 then transmits the history log information (818) to server 806 for recording and so that the client may be compensated if the delivery was untimely or incomplete.

Thus, the present invention provides an improved method, apparatus, and computer implementable instructions for reducing damages incurred by untimely delivery of data. The mechanism of the present invention provides for document delivery in which the delivery of data, such as electronic documents, images, or other data, is insured against untimely delivery.

It is important to note that while the present invention has been described in the context of a fully functioning data processing system, those of ordinary skill in the art will appreciate that the processes of the present invention are capable of being distributed in the form of a computer readable medium of instructions and in a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for insuring delivery of an electronic document, the method comprising:
   receiving a request from a requestor to insure delivery of the electronic document;
   responsive to receiving the request, identifying a payment amount to insure delivery based on network characteristics of a network in which the electronic document is to be transmitted to form an identified payment amount;
   sending an acknowledgment of the electronic document to the requestor, wherein the acknowledgment includes the identified payment amount; and
   delivering the electronic document in response to receiving a reply to the acknowledgment from the requestor accepting the identified payment amount.

2. The method of claim 1 further comprising:
   billing the requestor in response to receiving a reply to the acknowledgment accepting the identified payment amount.

3. The method of claim 1, wherein the payment amount is received in a form of electronic cash, a credit card charge, or a debit to an account.

4. The method of claim 1, wherein identifying step includes taking into account a value of the electronic document in addition to the network characteristics.

5. The method of claim 4, wherein an identified value of the electronic document is received from the requestor.

6. The method of claim 1, wherein the network characteristics includes at least one of congestion on a network, reliability of the network, and transmissions statistics for the network, wherein the network characteristics are maintained in a network database which is queried in response to identifying a delivery location for the electronic document such that the identified payment amount is based on actual network characteristics of the network in which the electronic document is to be transmitted.

7. The method of claim 1 further comprising:
   responsive to an inability to deliver the electronic document within a time guaranteed, sending a payment to requestor.

8. A method in a data processing system for insuring delivery of an electronic document, the method comprising:
   receiving a request from a requestor to insure delivery of the electronic document;
   analyzing the electronic document to identify an estimated amount of time in which the electronic document can be delivered, wherein the estimated amount of time is identified using a network database that maintains network characteristics of a network to be used in the delivery of the electronic document;
   receiving a delivery status of the electronic document;
   determining from the delivery status if the electronic document has been timely delivered based on the estimated amount of time; and
   if the electronic document has not been timely delivered, compensating the requestor.

9. A method in a data processing system for insuring delivery of an electronic document, the method comprising the data processing system implemented steps of:
   providing an insurance cost and an estimated time for timely delivery for the electronic document;
   receiving an indication of a payment for insurance for the timely delivery of the electronic document using a network; and
   providing insurance in response to the indication, wherein the payment is based on at least a number of times a party to whom insurance is being provided has been paid insurance proceeds for untimely delivery of electronic documents.

10. A data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to receive a request from a requestor to insure delivery of the electronic document; identify a payment amount to insure delivery based on network characteristics of a network in which the electronic document is to be transmitted to from an identified payment amount in response to receiving the request; send an acknowledgment of the electronic document to the requestor, wherein the acknowledgment includes the identified payment amount; and deliver the electronic document in response to receiving a reply to the acknowledgment from the requestor accepting the identified payment amount.

11. A data processing system for insuring delivery of an electronic document, the data processing system comprising:
    receiving means for receiving a request from a requestor to insure delivery of the electronic document;
    identifying means, responsive to receiving the request, for identifying a payment amount to insure delivery based on network characteristics of a network in which the electronic document is to be transmitted to form an identified payment amount;
    sending means for sending an acknowledgment of the electronic document to the requestor, wherein the acknowledgment includes the identified payment amount; and
    delivering means for delivering the electronic document in response to receiving a reply to the acknowledgment from the requestor accepting the identified payment amount.

12. The data processing system of claim 11 further comprising:
    billing means for billing the requestor in response to receiving a reply to the acknowledgment accepting the identified payment amount.

13. The data processing system of claim 11, wherein the payment amount is received in a form of electronic cash, a credit card charge, or a debit to an account.

14. The data processing system of claim 11, wherein identifying means includes taking into account a value of the electronic document in addition to the network characteristics.

15. The data processing system of claim 14, wherein an identified value of the electronic document is received from the requestor.

16. The data processing system of claim 11, wherein the network characteristics includes at least one of congestion on a network, reliability of the network, and transmissions statistics for the network, wherein the network characteristics are maintained in a network database which is queried in response to identifying a delivery location for the electronic document such that the identified payment amount is based on actual network characteristics of the network in which the electronic document is to be transmitted.

17. The data processing system of claim 11, wherein the sending means is a first sending means and further comprising:

second sending means, responsive to an inability to deliver the electronic document within a time guaranteed, for sending a payment to requestor.

18. A computer program product in a computer readable medium for insuring delivery of an electronic document, the computer program product comprising:

first instructions for receiving a request from a requester to insure delivery of the electronic document;

second instructions, responsive to receiving the request, for identifying a payment amount to insure delivery based on network characteristics of a network in which the electronic document is to be transmitted to form an identified payment amount;

third instructions for sending an acknowledgment of the electronic document to the requestor, wherein the acknowledgment includes the identified payment amount; and fourth instructions for delivering the electronic document in response to receiving a reply to the acknowledgment from the requestor accepting the identified payment amount.

\* \* \* \* \*